United States Patent [19]

Ohno et al.

[11] Patent Number: 4,668,977
[45] Date of Patent: May 26, 1987

[54] MULTI-BEAM PROJECTOR WITH DUAL-BEAM CATHODE RAY TUBES

[75] Inventors: Satoshi Ohno, Kanagawa; Koji Ichida, Tokyo; Hideo Tomita, Chiba; Atsushi Matsuzaki, Kanagawa, all of Japan

[73] Assignee: Sony Corporation, Tokyo, Japan

[21] Appl. No.: 647,920

[22] Filed: Sep. 6, 1984

[30] Foreign Application Priority Data

Sep. 6, 1983 [JP] Japan .................. 58-163794

[51] Int. Cl.⁴ .................. H04N 9/31; H04N 9/18
[52] U.S. Cl. .................. 358/60; 358/64
[58] Field of Search .................. 358/140, 242, 56, 60, 358/64, 65, 230, 231, 237; 313/409, 413; 315/13.1

[56] References Cited

U.S. PATENT DOCUMENTS

| | | | |
|---|---|---|---|
| 2,855,542 | 10/1958 | Schade | 315/13.1 |
| 3,363,129 | 1/1968 | DeFrance et al | 358/65 |
| 3,411,029 | 11/1968 | Karr | 313/409 |
| 3,513,350 | 5/1970 | Ohgoshi et al. | 315/13.1 |
| 4,259,692 | 3/1981 | D'Amato | 358/60 |
| 4,400,722 | 8/1983 | Miyatake et al. | 358/60 |
| 4,415,931 | 11/1983 | Dischert | 358/242 |
| 4,521,802 | 6/1985 | Ikeda | 358/140 |
| 4,604,547 | 8/1986 | Saito et al. | 313/413 |

FOREIGN PATENT DOCUMENTS

| | | | |
|---|---|---|---|
| 145428 | 11/1979 | Japan . | |
| 27755 | 2/1980 | Japan | 358/13.1 |
| 206034 | 12/1983 | Japan | 313/409 |
| 223992 | 12/1983 | Japan | 358/65 |
| 1424031 | 2/1976 | United Kingdom | 358/65 |
| 1064346 | 12/1983 | U.S.S.R. . | |

Primary Examiner—James J. Groody
Assistant Examiner—Randall S. Svihla

[57] ABSTRACT

A multi-beam projector incorporates a cathode ray tube for each of the primary colors red, green and blue, with each cathode ray tube having two electron beams, with all of said electron beams being horizontally and vertically deflected in synchronism with each other. Primary color video signals are supplied to one cathode of each cathode ray tube for generating a first beam, and a delayed primary color video signal is supplied to the second cathode of each cathode ray tube for generating a second beam spaced from the first beam by a predetermined interval. The interval spacing between the beam of the cathode ray tube for the blue primary color is wider than the interval between the electron beams for the other cathode ray tubes.

10 Claims, 27 Drawing Figures

FIG. 10A SCH
PRIOR ART

FIG. 10B SCH
PRIOR ART

FIG. 10C SCH
PRIOR ART

FIG. 10D SCH
PRIOR ART

FIG. 10E
PRIOR ART

SCH

FIG. 10F
PRIOR ART

SCH

FIG. 14A
CRT1R

FIG. 14B
CRT1G

FIG. 14C
CRT1B

FIG. 15

MULTI-BEAM PROJECTOR WITH DUAL-BEAM CATHODE RAY TUBES

BACKGROUND OF THE INVENTION

1. Field of the Invention

The present invention relates to a multi-beam video projector of multi-tube type which is constructed by using two-beam type cathode ray tubes.

2. Description of the Prior Art

Recently, in a video signal display apparatus of a large display area such as a video projector and the like, its resolution has been increased significantly by improvements of a cathode ray tube, an electric circuit and lenses which construct such display apparatus. However, as the resolution is increased, the scanning lines which, up to that time, were inconspicuous become visible or conspicuous, thus obstructing a picture quality from being improved.

In the visual display according to the interlaced system, in case of 525 scanning lines, 262.5 lines constitute one field and this one field is transmitted at the frequency of 60 Hz to suppress a field flicker. On the other hand, in order to obtain a vertical resolution, during the field next to a certain field, an electron beam scans the scanning line with ½ line interval apart from the scanning line in the preceding field.

In this case, however, macroscopically the number of picture images is 60 pictures/second, while microscopically one scanning line emanates light at every 1/30 second so that its display period is 1/30 second. As a result, when a viewed point is moved following the movement of the picture image, there is then a defect that the coarse scanning line structure formed of every other scanning lines in one field amount become conspicuous.

In order to remove the coarseness of the scanning line structure, it has been proposed in U.S. application Ser. No. 579,561, filed on Feb. 13, 1984, to use a cathode ray tube of 2-beam system to carry out the non-interlaced display. That is, in the cathode ray tube of 2-beam system, first and second electron beams simultaneously scan the scanning lines of the phosphor screen with ½ interval of the interval between the adjacent scanning lines in the interlace system. For 525 scanning lines, this 2-beam system can lighten all of the 525 scanning lines within one field and hence the non-interlaced display can be carried out. As a result, the coarseness of the above scanning line structure can be reduced and hence a picture image of high quality can be provided.

Figure 1:
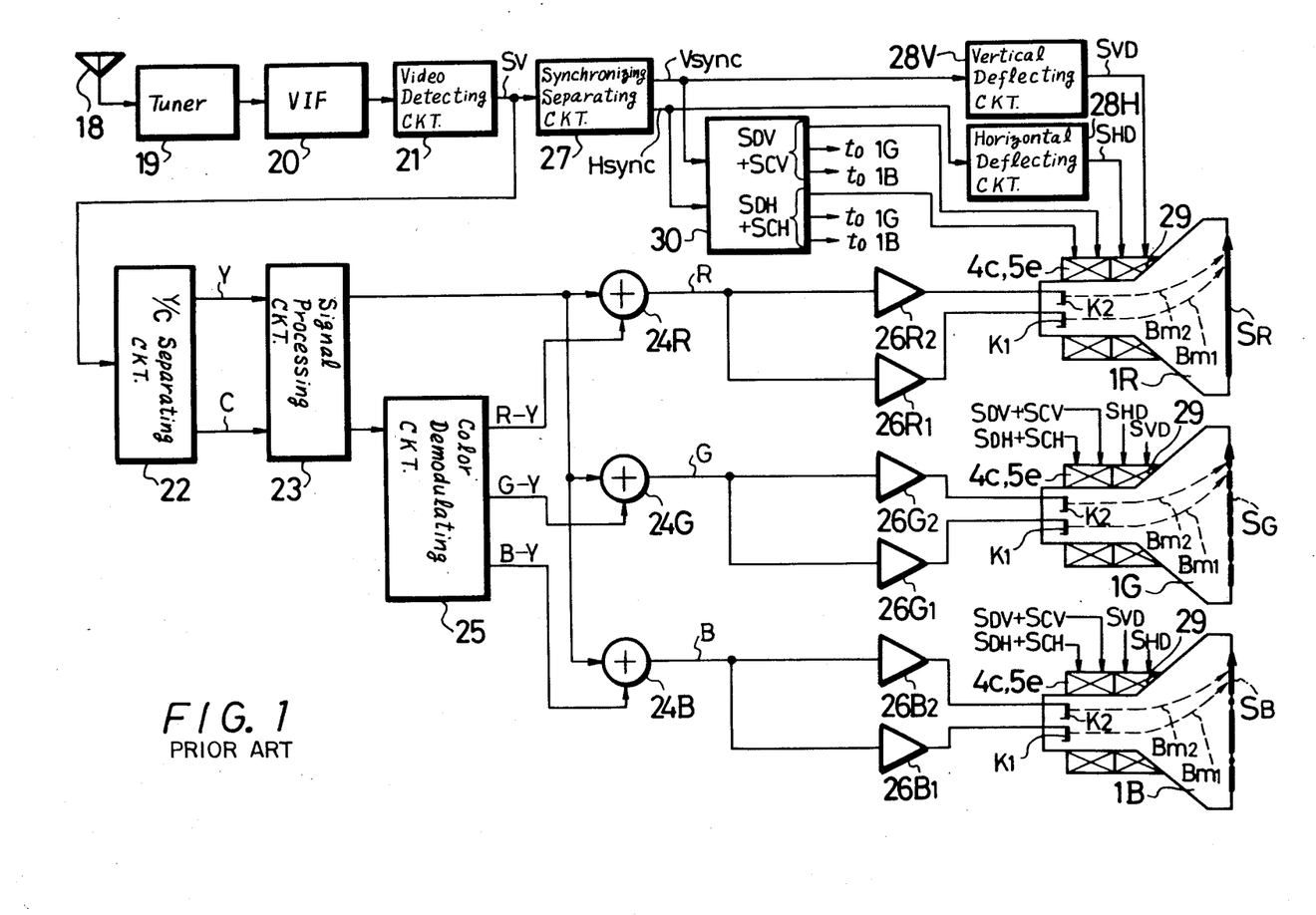
FIG. 1 is a systematic block diagram showing an example of a prior art 3-tube type video projector which employs 2-beam type monochromatic cathode ray tubes.

FIG. 1 shows an example of a prior art 3-tube type video projector which employs such 2-beam type monochromatic cathode ray tubes.

In FIG. 1, reference numerals 1R, 1G and 1B respectively designate monochromatic cathode ray tubes of a video projector type by which red, green and blue picture images $S_R$, $S_G$ and $S_B$ are formed, respectively. Though not shown, the image lights from the red, green and blue picture images $S_R$, $S_G$ and $S_B$ formed on the respective fluorescent screens of the cathode ray tubes 1R, 1G and 1B are respectively projected through projection lenses to a screen under being superimposed on one another so that a color image is displayed on this screen.

Figure 2:
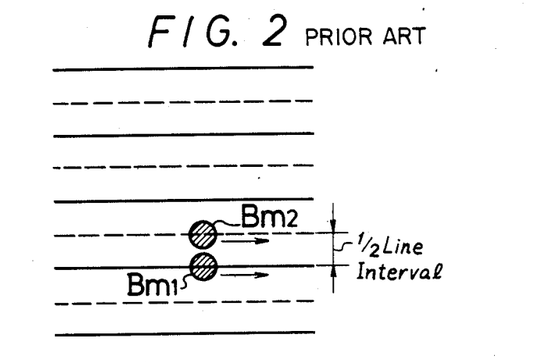
FIG. 2 is a diagram showing a scanning state of electron beams on the phosphor screen of the cathode ray tubes shown in FIG. 1.

Each of the cathode ray tubes 1R, 1G and 1B is formed as a 2-beam type. That is, in each of the cathode ray tubes, first and second cathodes K1 and K2 relating to first and second electron beams Bm1 and Bm2 are disposed in parallel to each other, and the first and second electron beams Bm1 and Bm2 emanated from the first and second cathodes K1 and K2 simultaneously scan the fluorescent screen apart from each other in the vertical direction with ½ line interval. By way of example, FIG. 2 shows such scanning state. In FIG. 2, solid lines and broken lines respectively illustrate scanning lines formed by the first and second electron beams Bm1 and Bm2.

Figure 3:
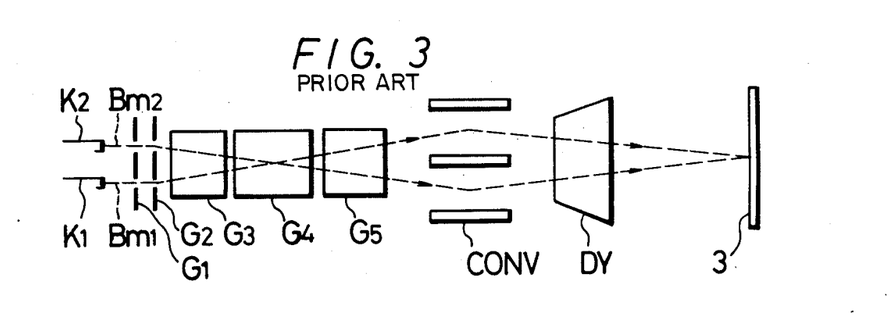
FIG. 3 is a diagram schematically showing a main part of a so-called Trinitron type cathode ray tube which is usable in the projector shown in FIG. 1.
Figure 4:
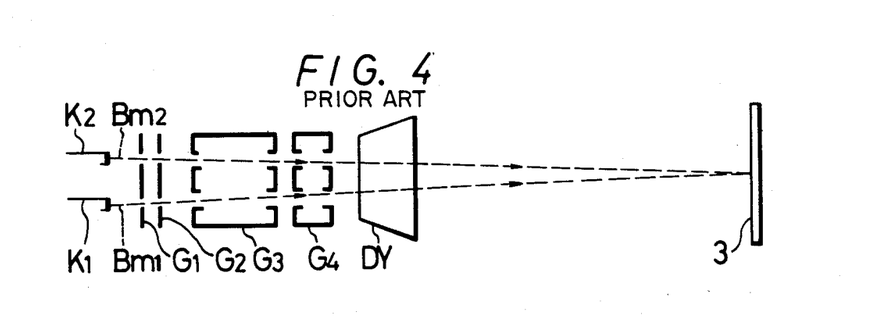
FIG. 4 is a diagram schematically showing a main part of a cathode ray tube of 2-electron gun type which is usable in the projector shown in FIG. 1.

Each of the cathode ray tubes 1R, 1G and 1B is formed of the Trinitron (registered trade mark) type shown in FIG. 3 or 2-electron gun type as, for example, shown in FIG. 4. At any rate, each of the cathode ray tubes includes the first and second cathodes K1 and K2 relating to the first and second electron beams Bm1 and Bm2. In FIG. 3, references $G_1$ to $G_5$ respectively designate control grids, CONV a convergence electrode (electrostatic deflection plate) and DY a deflection yoke, while in FIG. 4, references $G_1$ to $G_4$ respectively designate control grids and DY a deflection yoke. In addition, in FIGS. 3 and 4, reference numeral 3 designates a phosphor or fluorescent screen.

In order that the first and second electron beams Bm1 and Bm2 may impinge upon the screen, namely the fluorescent screen 3 apart with each other in the vertical direction about ½ line interval, a predetermined magnetic field is applied from the outside to the passages of the first and second electron beams Bm1 and Bm2.

Figure 5:
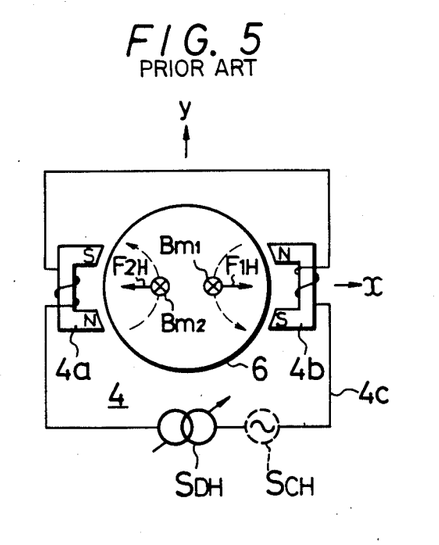
FIG. 5 is a diagram showing an example of a horizontal convergence yoke used in the cathode ray tube.
Figure 6:
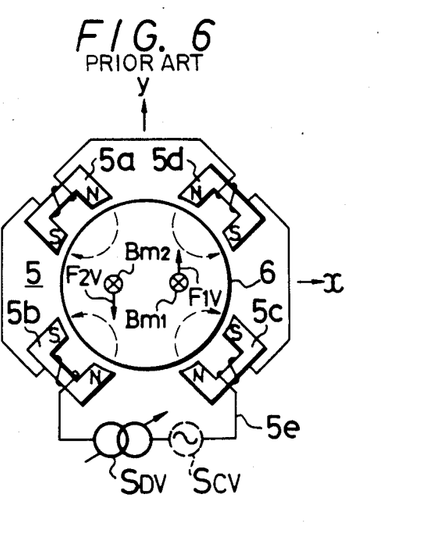
FIG. 6 is a diagram showing an example of a vertical convergence yoke used in the cathode ray tube.

Now, let it be considered that the first and second cathodes K1 and K2 be disposed in parallel to each other in the horizontal direction. In this case, a horizontal convergence yoke 4 and a vertical convergence yoke 5 are disposed as, for example, shown in FIGS. 5 and 6 on the plane perpendicular to the tubular axis at the side closer to the cathode side than the deflection yoke DY and at the place at which the first and second electron beams Bm1 and Bm2 are distant apart from each other (accordingly, the center of the grid $G_4$ in FIG. 3 is not permissible). In FIGS. 5 and 6, reference numeral 6 designates the neck portion, x the horizontal direction and y the vertical direction, respectively. The horizontal convergence yoke 4 shown in FIG. 5 is formed of a pair of cores 4a and 4b, which are disposed across, for example, the neck portion 6 in the horizontal direction x, around which a coil 4c is wound in a predetermined direction. A D.C. current $S_{DH}$ of a predetermined magnitude is flowed in the coil 4c so that predetermined magnetic poles are produced at the tip pieces of the cores 4a and 4b, respectively. If the magnetic poles generated at the tip pieces of the cores 4a and 4b are as shown in FIG. 5, magnetic fields shown by broken lines are generated. Accordingly, if the first and second electron beams Bm1 and Bm2 are oriented in the direction perpendicular to the sheet of the drawing as shown by marks X, these first and second electron beams Bm1 and Bm2 are given forces F1H and F2H which are opposite to each other in the horizontal direction. In this case, when the magnitude of the magnetic field is controlled, namely, the magnitude of the D.C. current $SD_H$ is controlled, the forces F1H and F2H are varied. When the magnetic poles which are generated at the tip pieces of the cores 4a and 4b are oriented in the direction opposite to those in the figure, the forces F1H and F2H are oriented in the directions opposite to those in the figure. Consequently, when the D.C. current $S_{DH}$ is varied, the first and second electron beams Bm1 and Bm2, for example, can be impinged on the same position at, for example, the center of the phosphor screen 3 in the horizontal direction.

On the other hand, the vertical convergence yoke 5 shown in FIG. 6 is formed of cores 5a, 5b, 5c and 5d which are disposed around, for example, the neck portion 6 with an angular spacing of 90° between adjacent ones in the horizontal and vertical directions x and y around which a coil 5e is wound in a predetermined direction. Then, a D.C. current $S_{DV}$ of a predetermined magnitude is flowed in the coil 5e so that predetermined magnetic poles are generated in the tip pieces of the cores 5a, 5b, 5c and 5d. If the magnetic poles generated at the cores 5a, 5b, 5c and 5d are as shown in FIG. 6, magnetic fields shown by broken lines in the figure are generated. Accordingly, if the first and second electron beams Bm1 and Bm2 are oriented in the direction perpendicular to the sheet of the drawing as shown by marks X , these first and second electron beams Bm1 and Bm2 are given forces F1V and F2V which are opposite to each other in the vertical direction y. In this case, when the magnitude of the magnetic field is controlled, namely, the magnitude of the D.C. current $S_{DV}$ is controlled, the forces F1V and F2V are varied. If the magnetic poles generated at the tip pieces of the cores 5a, 5b, 5c and 5d are oriented in the directions opposite to those in the figure, the directions of the forces F1V and F2V become opposite to those in the figure. Consequently, when the D.C. current $S_{DV}$ is varied, the first and second electron beams Bm1 and Bm2, for example, can impinge upon the phosphor screen 3 at its center with approximately ½ line interval apart from each other in the vertical direction.

When the first and second cathodes K1 and K2 are disposed in parallel to each other in the vertical direction, the convergence yoke 4 shown in FIG. 5 is rotated 90° and used as the vertical convergence yoke, while the convergence yoke 5 shown in FIG. 6 is used as the horizontal convergence yoke as it is.

Figure 7:
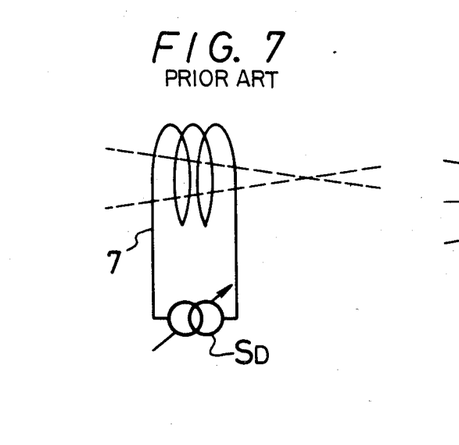
FIG. 7 is a diagram showing a twist coil used for generating a magnetic field in the tube axis direction of the cathode ray tube.
Figure 8:
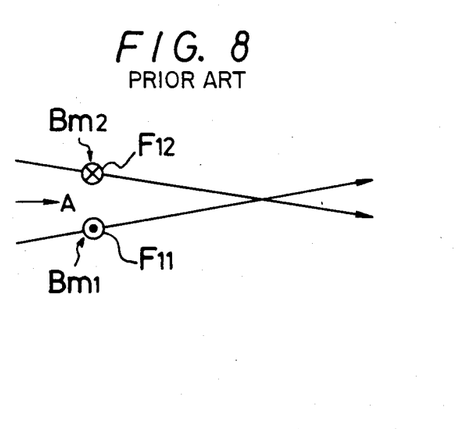
FIG. 8 is a diagram useful for explaining the action of the magnetic field generated by the twist coil shown in FIG. 7 on the electron beams in the cathode ray tube.

Further, it is possible that as shown in FIG. 7, a twist coil 7 is wound around a neck portion (not shown) and the D.C. current $S_D$ is flowed thereto to generate the magnetic field in the tube axis direction. Accordingly, as shown in FIG. 8, if the direction of the magnetic field generated by the twist coil 7 is taken as A, the first electron beam Bm1 is given a force F11 which comes toward the sheet of the drawing in the direction perpendicular to the sheet of the drawing as shown by mark ., while the second electron beam Bm2 is given a force F12 which goes to the sheet of the drawing in the direction perpendicular to the sheet of drawing as shown by X . Therefore, in the cathode ray tube in which the first and second cathodes K1 and K2 are disposed in parallel to each other in the horizontal direction, this twist coil 7 can be used instead of the vertical convergence yoke, while in the cathode ray tube in which the first and second cathodes K1 and K2 are disposed in parallel to each other in the vertical direction, this twist coil 7 can be used instead of the horizontal convergence yoke.

Depending on the accuracy in assembling the deflection yoke DY and the electron gun, it is general that each of the cathode ray tubes has its peculiar mis-convergence. Accordingly, as shown by broken lines in FIGS. 5 and 6, together with the D.C. currents $S_{DH}$ and $S_{DV}$, compensating signals $S_{CH}$ and $S_{CV}$ are flowed in the coils 4c and 5e. As a result, the first and second electron beams Bm1 and Bm2 are compensated for such that throughout the whole of the phosphor screen 3 the first and second electron beams Bm1 and Bm2 impinge on the phosphor screen 3 at the same position relative to the horizontal direction x, while the first and second electron beams Bm1 and Bm2 impinge thereon with approximately ½ line interval apart from each other in the vertical direction y.

The compensating signals $S_{CH}$ and $S_{CV}$ are made different depending on the modes of mis-convergence.

Figure 9A:
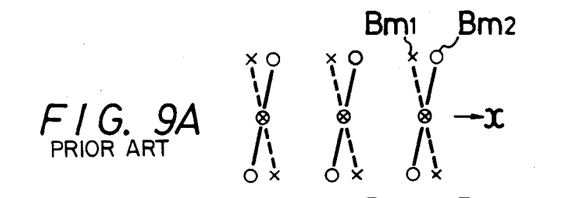
FIGS. 9A to 9F are respectively diagrams useful for explaining horizontal mis-convergences.
Figure 9B:
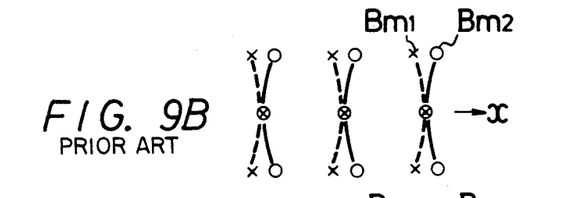
Figure 9C:
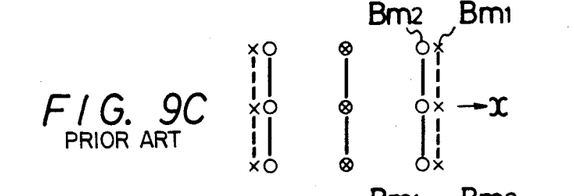
Figure 9D:
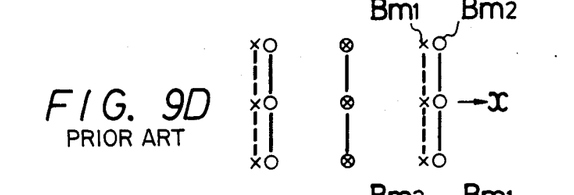
Figure 9E:
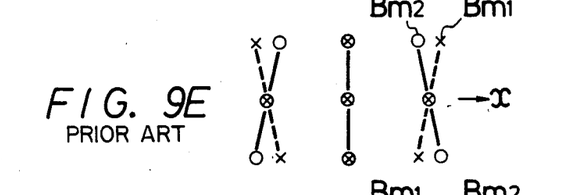
Figure 9F:
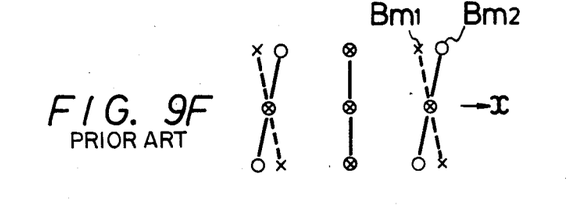
Figure 10A:
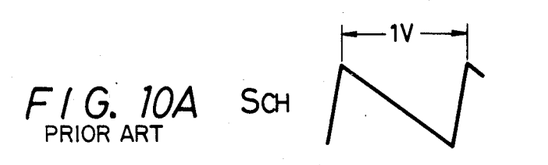
FIGS. 10A to 10F are respectively waveform diagrams of various compensating signals used to compensate for the mis-convergences shown in FIGS. 9A to 9F.
Figure 10B:
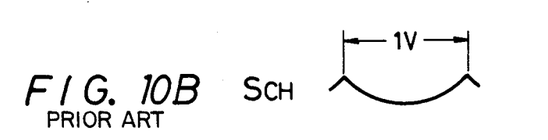
Figure 10C:
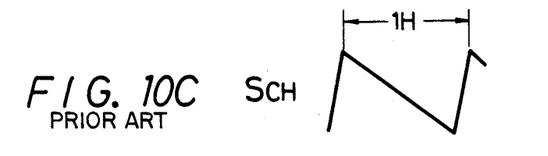
Figure 10D:
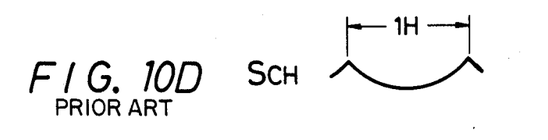
Figure 10E:
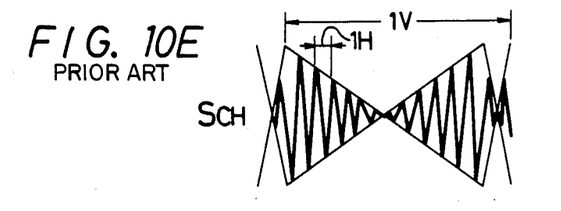
Figure 10F:
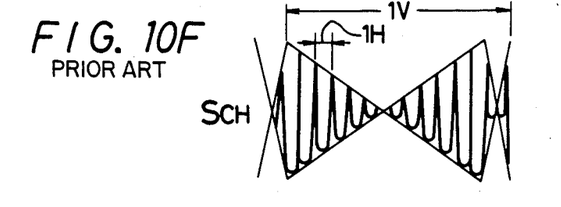

When a horizontal mis-convergence as, for example, shown in FIG. 9A is caused, a sawtooth waveform current having a cycle of one vertical period (IV) as shown in FIG. 10A is supplied as the compensating signal $S_{CH}$. In FIG. 9A–9F marks X and • respectively represent the first and second electron beams Bm1 and Bm2. As described above, the first and second electron beams Bm1 and Bm2 impinge upon the phosphor screen 3 at the same position relative to the horizontal direction x, while with approximately ½ line interval apart from each other relative to the vertical direction y. However, in FIGS. 9A–9F, for simplicity of description, it is assumed that the first and second electron beams Bm1 and Bm2 impinge upon the phosphor screen 3 at the same position in the horizontal and vertical directions. When a horizontal mis-convergence as shown in FIG. 9B is caused, a parabolic waveform current having a cycle of 1V as shown in FIG. 10B is supplied as the compensating signal $S_{CH}$. When a horizontal mis-convergence as shown in FIG. 9C is caused, a sawtooth waveform current having a cycle of one horizontal period (1H) as shown in FIG. 10C is supplied as the compensating signal $S_{CH}$. When a horizontal mis-convergence as shown in FIG. 9D is caused, a parabolic waveform current having a period of 1H as shown in FIG. 10D is supplied as the compensating signal $S_{CH}$. When a horizontal mis-convergence as shown in FIG. 9E is caused, a current whose waveform is formed by multiplying the sawtooth waveform of the cycle of 1V with the sawtooth waveform of the cycle of 1H as shown in FIG. 10E is produced and then supplied as the compensating signal $S_{CH}$. When a horizontal mis-convergence as shown in FIG. 9F is caused, a current whose waveform is formed by integrating the waveform shown in FIG. 10E is produced as shown in FIG. 10F and then supplied as the compensating signal $S_{CH}$. These examples are typical ones, and in practice, the currents of the waveforms in the respective cases are combined and then used as the compensating signal $S_{CH}$.

While the compensating signal $S_{CH}$ is described as above, the compensating signal $S_{CV}$ can be considered the same.

Figure 11:
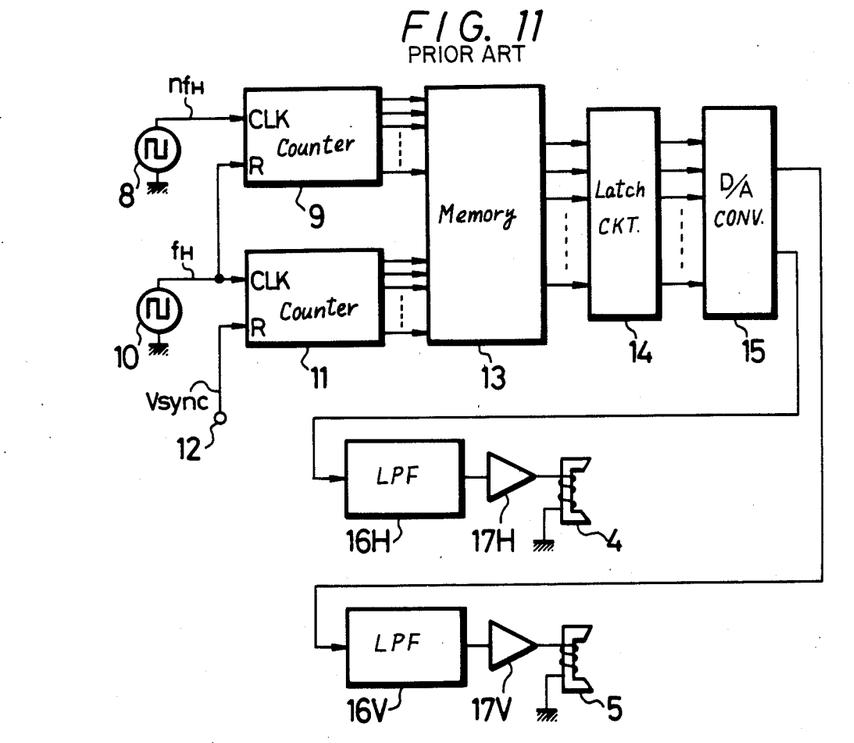
FIG. 11 is a block diagram showing a circuit arrangement which produces the compensating signals.

Moreover, it is possible that as, for example, shown in FIG. 11, the compensating signals $S_{CH}$ and $S_{CV}$ for respective portions of the phosphor screen are written in advance in a memory, the written compensating signals $S_{CH}$ and $S_{CV}$ are read out in turn from the memory in response to the scanning positions of the first and second electron beams Bm1 and Bm2 and, then delivered.

In FIG. 11, reference numeral 8 designates a signal generator which generates a signal with a frequency $nf_H$ (n represents an integer from, for example, 5 to 50 and $f_H$ a horizontal frequency). The signal with the frequency $nf_H$ derived therefrom is supplied to a counter 9 which forms a read address signal. Reference numeral 10 designates a signal generator which generates a signal with the frequency $f_H$. The signal with the frequency $f_H$ derived therefrom is supplied to a counter 11 which generates a read address signal and also to the counter 9 as its reset signal. From a terminal 12 is supplied a vertical synchronizing signal $V_{sync}$ to the counter 11 as its reset signal. From the counters 9 and 11 are derived read address signals corresponding to the scanning positions of the first and second electron beams Bm1 and Bm2, which then are supplied to a memory 13. In the memory 13 are written in advance the compensating signals $S_{CH}$ and $S_{CV}$ corresponding to the scanning positions of the first and second electron beams Bm1 and Bm2 which then are read out in turn therefrom on the basis of the address signals. The read-out compensating signals $S_{CH}$ and $S_{CV}$ are latched by a latch circuit 14 and then converted to the form of analog signals by a D/A (digital-to-analog) converter 15, which then are supplied through low pass filters 16H, 16V and amplifiers 17H, 17V to horizontal convergence yoke 4 and vertical convergence yoke 5.

Depending on the designing of the cathode ray tube, the above D.C. currents $S_{DV}$ and $S_{DH}$ may not always be required. For example, if the first and second cathodes K1 and K2 are disposed in parallel to each other in the horizontal direction and the first and second electron beams Bm1 and Bm2 emanated therefrom impinge upon, for example, the center of the phosphor screen 3 at the same position relative to the horizontal direction, the D.C. current $S_{DH}$ is not necessary. On the other hand, if, for example, the first and second cathodes K1 and K2 are disposed in parallel to each other in the vertical direction and the first and second electron beams Bm1 and Bm2 impinge upon, for example, the center of the phosphor screen 3 at the same position relative to the horizontal direction, while with approximately ½ line interval apart from each other in the vertical direction, the D.C. currents $S_{DH}$ and $S_{DV}$ are not necessary.

In the above example, the scanning positions of the first and second electron beams Bm1 and Bm2 are controlled by means which uses the magnetic vertical convergence yoke 5 and horizontal convergence yoke 4 or the twist coil 7. The control means for such purpose is not limited to the above but the following version may be possible. Namely, by way of example, horizontal and vertical compensating plates are disposed in the directions perpendicular to each other within the cathode ray tube to which the control voltages are applied, so that the scanning positions of the first and second electron beams Bm1 and Bm2 are controlled electrostatically.

The cathode ray tubes 1R, 1G and 1B are each constructed as described above. Thus, the first and second electron beams Bm1 and Bm2 emanated from the first and second cathodes K1 and K2 simultaneously scan the phosphor screen with approximately ½ line interval apart from each other in the vertical direction.

In the projector shown in FIG. 1, the same red primary color signal R, green primary color signal G and blue primary color signal B are respectively supplied to the first and second cathodes K1 and K2 in the respective cathode ray tubes 1R, 1G and 1B which then are driven thereby.

In FIG. 1, reference numeral 18 designates an antenna, 19 a tuner, 20 an intermediate frequency amplifier and 21 a video detecting circuit. A video signal $S_V$ derived from the video detecting circuit 21 is supplied to a luminance signal/chrominance signal separating circuit 22. A luminance signal Y derived from this separating circuit 22 is supplied through a signal processing circuit 23 for picture control and so on to adders 24R, 24G and 24B. While, a chrominance signal C derived from the separating circuit 22 is supplied through the signal processing circuit 23 to a color demodulating circuit 25. From the color demodulating circuit 25 are derived, for example, a red color-difference signal R-Y, a green color-difference signal G-Y and a blue color-difference signal B-Y which then are supplied to the adders 24R, 24G and 24B, respectively.

The adder 24R generates a red primary color signal R which then is supplied through amplifiers $26R_1$, $26R_2$ to the first and second cathodes K1 and K2 of the cathode ray tube 1R. The adder 24G generates a green primary color signal G which then is supplied through amplifiers $26G_1$, $26G_2$ to the first and second cathodes K1 and K2 of the cathode ray tube 1G. Further, the adder 24B generates a blue primary color signal B which then is supplied through amplifiers $26B_1$, $26B_2$ to the first and second cathodes K1 and K2 of the cathode ray tube 1B.

In FIG. 1, the video signal $S_V$ derived from the video detecting circuit 21 is further supplied to a synchronizing separating circuit 27. A vertical synchronizing signal $V_{sync}$ and a horizontal synchronizing signal $H_{sync}$ derived from the separating circuit 27 are respectively supplied to a vertical deflecting circuit 28V and a horizontal deflecting circuit 28H. From these deflecting circuits 28V and 28H are supplied deflecting signals $S_{VD}$ and $SH_D$ to deflection coils 29 in the cathode ray tubes 1R, 1G and 1B.

The synchronizing signals $V_{sync}$ and $H_{sync}$ from the separating circuit 27 are both supplied to a convergence circuit 30. In the convergence circuit 30, the D.C. current $S_{DV}$ and the compensating signal $S_{CV}$ which are supplied, for example, to the coil 5e in the vertical convergence yoke 5 as described above are formed and the D.C. current $SD_H$ and compensating current $S_{CH}$ which are supplied to the coil 4c in the horizontal convergence yoke 4 are formed, respectively. These currents are formed differently so as to correspond to these cathode ray tubes 1R, 1G and 1B, respectively. These signals are supplied to each of the coils 4c and 5e which construct, for example, the convergence yokes 4 and 5 in each of the cathode ray tubes 1R, 1G and 1B.

The projector shown in FIG. 1 is constructed as described above. Therefore, the same red primary color signal R is supplied to the first and second cathodes K1 and K2 of the cathode ray tube 1R which then are driven. Thus, the first and second electron beams Bm1 and Bm2 emanated from the first and second cathodes K1 and K2 scan simultaneously the phosphor screen with approximately ½ line interval apart from each other in the vertical direction. In a one-beam system cathode ray tube with 525 scanning lines, only 262.5 scanning lines emit light within one field. However, while in the cathode ray tube shown in FIG. 1, the remaining 262.5 scanning lines simultaneously emit light within the same field as the first 262.5 scanning lines so that the visual displays are formed on all of 525 lines during each field. Thus, the red picture image $S_R$ is displayed on the picture screen as described above.

Similarly, the green picture image $S_G$ and the blue picture image $S_B$ are displayed on the picture screens of the cathode ray tubes 1G and 1B, respectively.

As described above, according to the video projector shown in FIG. 1, the red picture image $S_R$, the green picture image $S_G$ and the blue picture image $S_B$ can be displayed on the picture screens of the cathode ray tubes 1R, 1G and 1B with the flicker of the scanning line never being perceived. As a result, a color picture image of excellent picture quality can be displayed on the screen (not shown).

Figure 12:
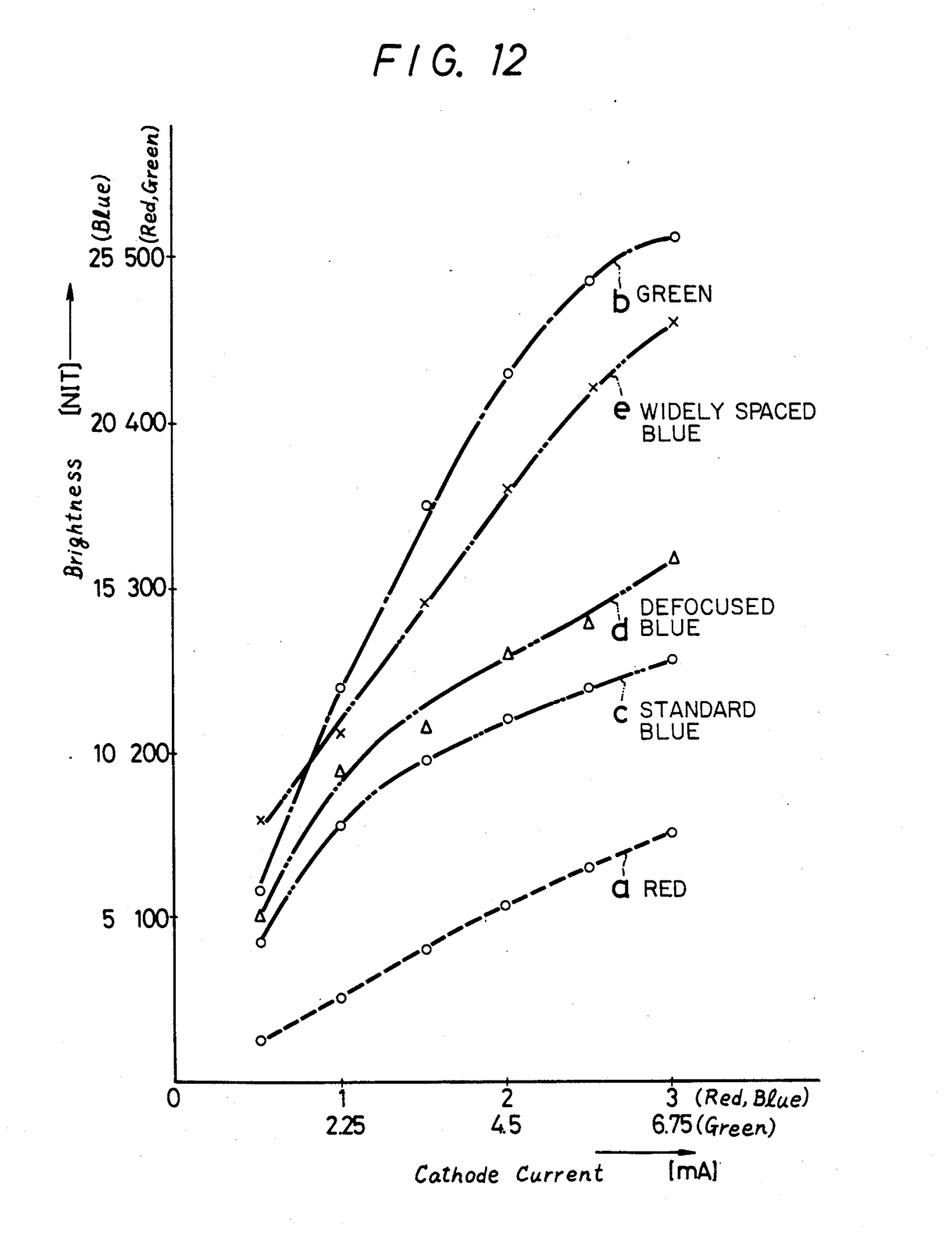
FIG. 12 is a graph indicating brightness characteristics on the phosphor screen of the cathode ray tube vs. cathode currents.

FIG. 12 is a graph showing brightness characteristics of the phosphor screens of the cathode ray tubes 1R, 1G and 1B. In the graph of FIG. 12, the abscissa indicates the cathode current and the ordinate indicates the brightness at that time. In the scale of the abscissa, red, green and blue are respectively selected with the ratio of 1:2.25:1 which is the current ratio under which the white balance is established. In the ordinate, blue is indicated 1/20 as high as red and green. As the red, green and blue phosphors of the cathode ray tubes 1R, 1G and 1B, there can respectively used $Y_2O_3$:Eu (yttrium oxide phosphor activated by europium), $Y_3Al_5O_{12}$:Tb (YAG phosphor activated by terbium) and ZnS:Ag (zinc sulfide activated by silver).

In the graph of FIG. 12, curves a, b and c respectively indicate phosphor brightness characteristics of the cathode ray tubes 1R, 1G and 1B.

As will be clear from FIG. 12, the brightness saturation on the phosphor screen of the cathode ray tube 1B occurs earlier than those of the cathode ray tubes 1R and 1G. Accordingly, in the video projector shown in FIG. 1, if the cathode current is increased to obtain a picture image of high brightness, there is then a defect that the color becomes yellowish.

In order to prevent rapid brightness saturation on the phosphor screen of the cathode ray tube 1B, it may be considered to alter the focus of the blue light. In this case, there is, however, such a defect that the resolution is lowered and the blue color appears around the white color and hence the picture quality is deteriorated. A curve d in FIG. 12 indicates the resultant brightness characteristic on the phosphor screen of the cathode ray tube at that time.

OBJECTS AND SUMMARY OF THE INVENTION

Accordingly, it is an object of the present invention to provide an improved multi-beam video projector.

It is another object of the present invention to provide a multi-beam video projector capable of producing a picture screen of high brightness while preventing the picture quality from being deteriorated.

According to one aspect of the present invention, there is provided a multi-beam projector achieving the above objects.

The other objects, features and advantages of the present invention will become apparent from the following description taken in conjunction with the accompanying drawings through which the like references designate the same elements and parts.

DESCRIPTION OF THE PREFERRED EMBODIMENTS

Now, an embodiment of a multi-beam video projector of multi-tube type according to the present invention will hereinafter be described with reference to FIG. 13. In this embodiment, in order to prevent rapid brightness saturation on the phosphor screen of the cathode ray tube 1B the spacing between the first and second electron beams Bm1 and Bm2 of the cathode ray tube 1B is made wider than a spacing corresponding to afterglow time of the phosphor. In other words, in this embodiment, it should be noted that in the prior art shown in FIG. 1, the interval between the first and second electron beams Bm1 and Bm2 is selected to be ½ line interval between the adjacent scanning lines and the superimposition between the light-emission by the first electron beam Bm1 and the light emission by the second electron Bm2 promotes the saturation of brightness.

Figure 13:
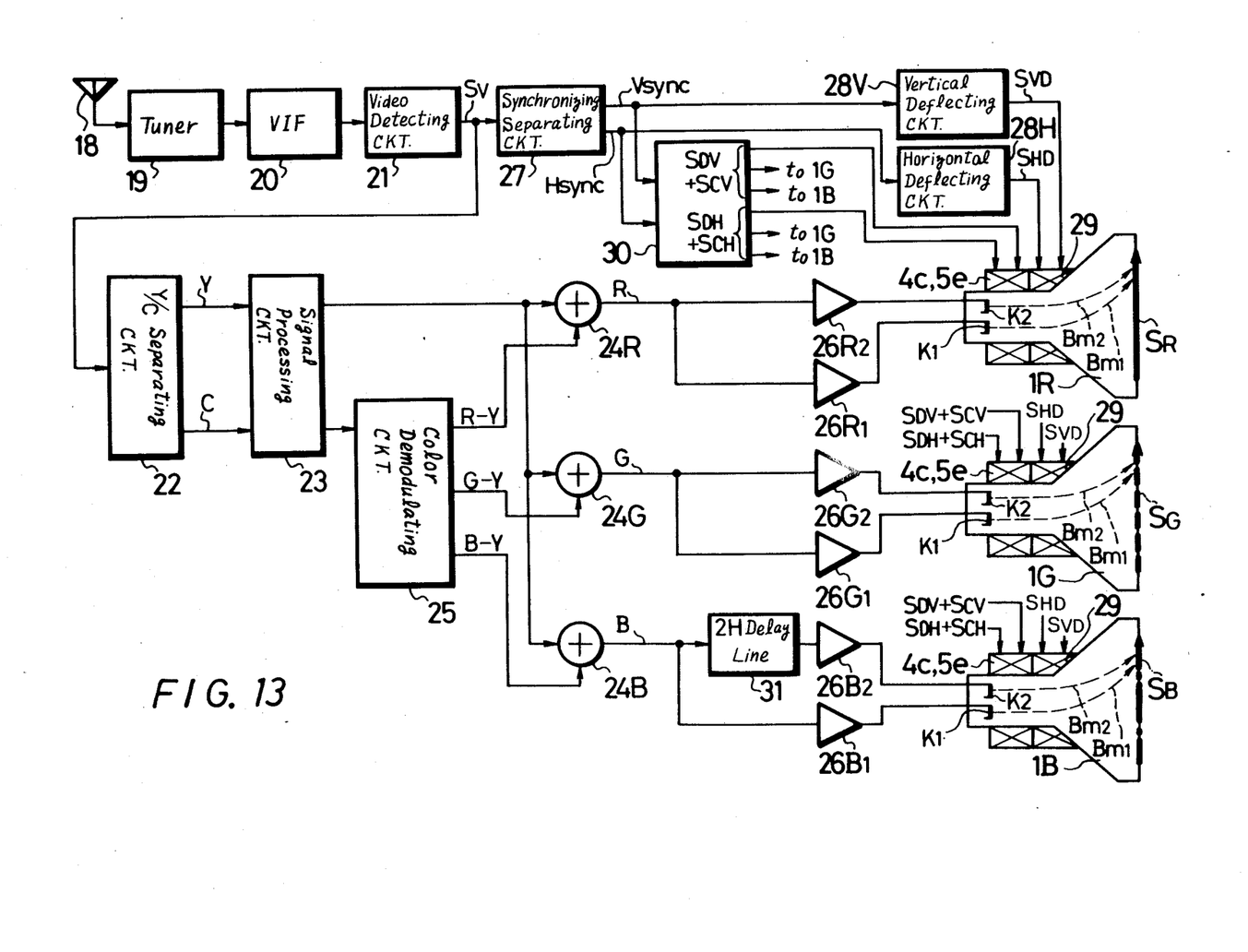
FIG. 13 is a systematic block diagram showing an embodiment of a multi-beam video projector of multi-tube type according to the present invention.

In FIG. 13, like parts corresponding to those in FIG. 1 are marked with the same references and will not be described in detail.

Figure 14A:
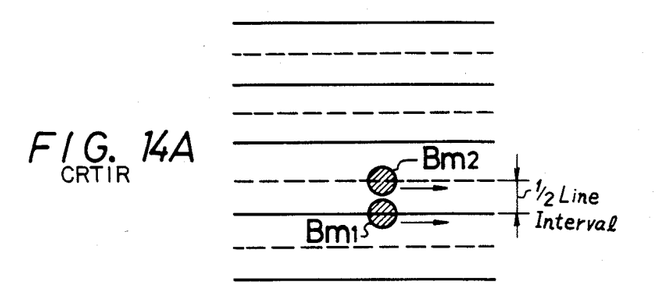
FIGS. 14A to 14C are respectively diagrams showing scanning states of the electron beams on the phosphor screens of the cathode ray tubes used to explain the operation of the multi-beam video projector shown in FIG. 13.
Figure 14B:
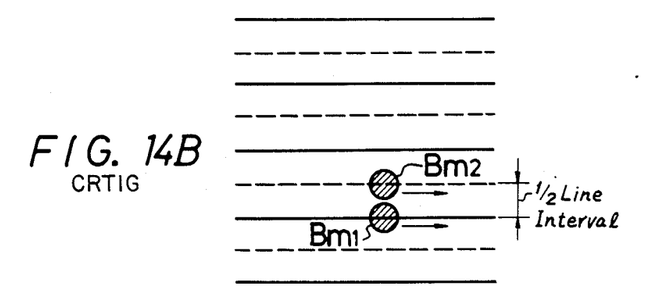
Figure 14C:
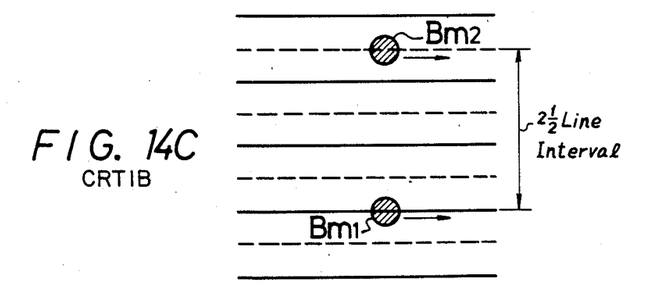

In this embodiment of the present invention, the second electron beam Bm2 in the cathode ray tube 1B scans the position two horizontal periods (2H) before the first beam Bm1. That is, the interval between the first and second electron beams Bm1 and Bm2 is displaced by 2½ line interval in the vertical direction (refer to FIG. 14C). This displacement is realized by adjusting the DC currents $S_{DV}$, $S_{DH}$ and the compensating signals $SC_V$, $SC_H$ derived from the convergence circuit 30. In this case, since the afterglow time of the blue phosphor (ZnS:Ag) in the cathode ray tube 1B is substantially 50 μsec, is possible to have the second electron beam Bm2 scan the position, for example, 1 horizontal period (1H ≅ 63.5 μsec) before the first beam Bm1. However, since the first and second electron beams Bm1 and Bm2 are superposed on each other depending on the size of the beam spot, the second electron beam Bm2 scans the position 2H before the first beam Bm1 in this embodiment. In short, it is sufficient that the interval between the first and second electron beams Bm1 and Bm2 is made to be wider than the interval corresponding to the afterglow time of the blue phosphor in the cathode ray tube 1B. Each of the intervals between the first and second electron beams Bm1 and Bm2 of the cathode ray tubes 1R and 1G is displaced by $\frac{1}{2}$ line interval (refer to FIGS. 14A and 14B) similarly to the prior art example shown in FIG. 1.

In this embodiment, the blue primary color signal B supplied to the second cathode K2 of the cathode ray tube 1B is delayed by 2H for the signal to correspond to the scanning position of the second electron beams Bm2. That is, a delay line 31 having a delay time of 2H is connected to the preceding stage of the amplifier $26B_2$.

The others components of the embodiment shown in FIG. 13 are constructed similarly to the prior art example shown in FIG. 1.

While in the embodiment shown in FIG. 13 the interval between the first and second electron beams Bm1 and Bm2 of the cathode ray tube 1B is displaced by $2\frac{1}{2}$ line interval, the non-interlaced visual display is carried out by the first and second electron beams Bm1 and Bm2 similarly to the example shown in FIG. 1 so that it is possible to obtain the blue color picture image similar to that of the example shown in FIG. 1.

In the graph of FIG. 12, a curve e indicates the brightness characteristic of the phosphor screen in the cathode ray tube 1B. The curve e indicates that the brightness saturation is caused by a cathode current larger than that of the example shown in FIG. 1 (see the curve c in FIG. 12). This is because the light emission by the first electron beam Bm1 and the light emission by the second electron beam Bm2 are prevented from being superimposed with each other.

As described above, according to this embodiment, the brightness saturation of the cathode ray tube 1B can be caused by the cathode current larger than that of the example shown in FIG. 1. In the video projector according to this embodiment, any one of the brightness characteristics of the cathode ray tubes 1R, 1G and 1B can be used so as to keep the white balance, following the cathode current which is extended linearly. Consequently, according to this embodiment, as compared with the cathode ray tubes 1R, 1G and 1B in the example shown in FIG. 1, the cathode ray tubes 1R, 1G and 1B can be used with the white balance being held up to the larger cathode current and hence the picture of high brightness can be obtained. In addition, since the focus of any of the beams is not altered, there is no defect of causing the picture quality to be deteriorated.

Figure 15:
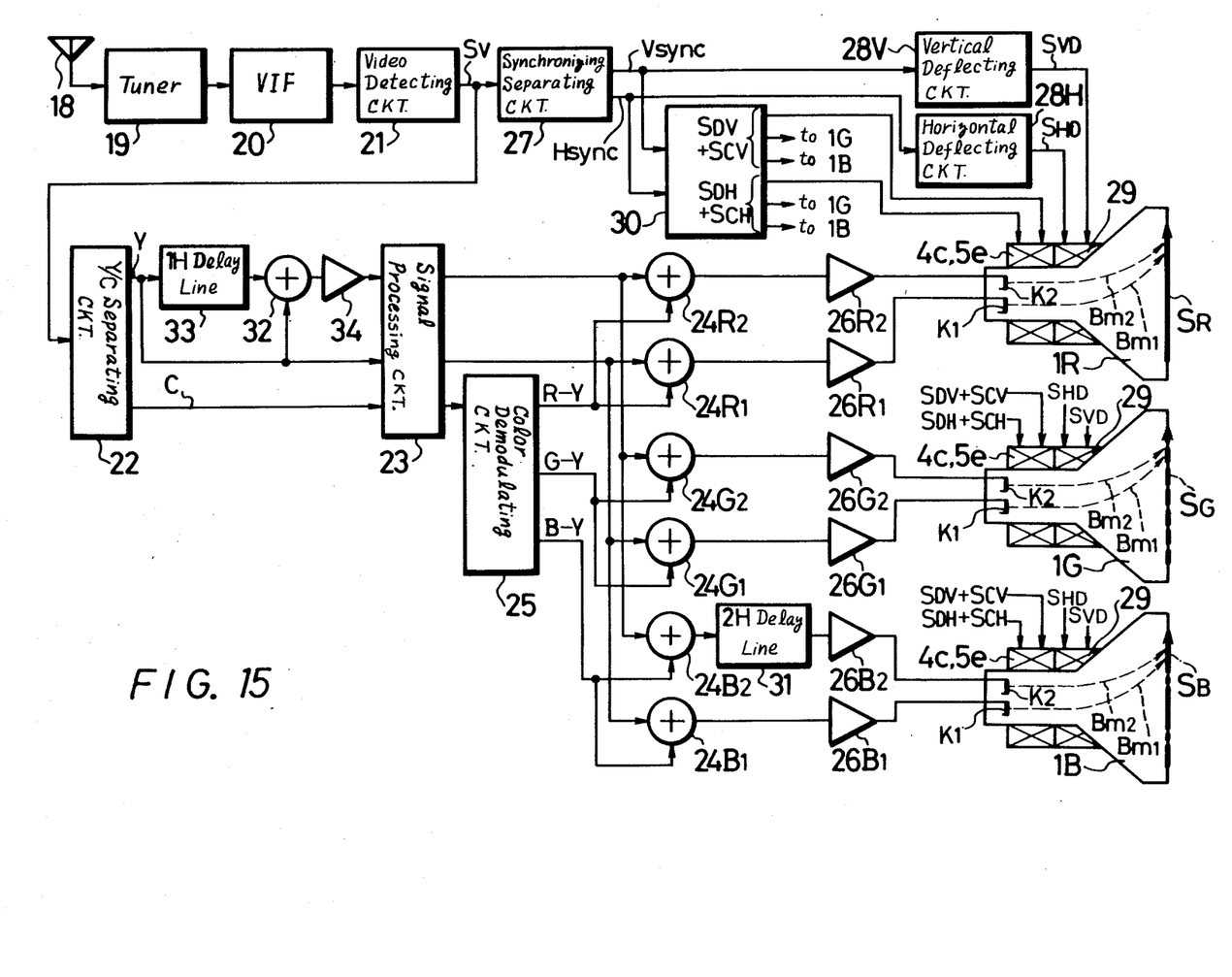
FIG. 15 is a systematic block diagram showing another embodiment of the multi-beam video projector of multi-tube type according to the present invention.

FIG. 15 shows another embodiment of the multi-beam video projector of multi-tube type according to the present invention. In FIG. 15, like parts corresponding to those in FIG. 13 are marked with the same references.

In the second embodiment shown in FIG. 15, a signal provided by adding a luminance signal component and a color-difference signal component of the signal from one scanning line (the signal from the present scanning line) is supplied to the first cathodes K1 of each of the cathode ray tubes 1R, 1G and 1B, while a signal, which is formed by adding and averaging the luminance signal component from the signal of the one scanning line and the luminance signal component of the signal from the preceding scanning line (the signal from the scanning line preceding the present scanning line) and by adding and averaging the former and the color-difference signal component of the signal from the one scanning line, is supplied to the second cathodes K2.

In FIG. 15, the luminance signal Y separated by the luminance signal/chrominance signal separating circuit 22 is supplied directly to an adder 32 and also supplied through a delay line 33 having a delay amount of 1H to the adder 32. The added signal from this adder 32 is adjusted to have the $\frac{1}{2}$ level by a level adjuster 34 and then supplied through the signal processing circuit 23 to adders $24R_2$, $24G_2$ and $24B_2$. The luminance signal Y separated by the separating circuit 22 is also supplied through the signal processing circuit 23 to adders $24R_1$, $24G_1$ and $24B_1$.

The chrominance signal C separated by the separating circuit 22 is supplied through the signal processing circuit 23 to a color demodulating circuit 25. The red color-difference signal R-Y, the green color-difference signal G-Y and the blue color-difference signal B-Y derived from the color demodulating circuit 25 are respectively supplied to the adders $24R_1$, $24R_2$; $24G_1$, $24G_2$; and $24B_1$, $24B_2$.

The added signals from the adders $24R_1$ and $24R_2$ are respectively supplied through amplifiers $26R_1$ and $26R_2$ to the first and second cathodes K1 and K2 of the cathode ray tube 1R. The added signals from the adders $24G_1$ and $24G_2$ are respectively supplied through amplifiers $26G_1$ and $26G_2$ to the first and second cathodes K1 and K2 of the cathode ray tube 1G. The added signal from the adder $24B_1$ is supplied through an amplifier $26B_1$ to the first cathode K1 of the cathode ray tube 1B. Further, the added signal from the adder $24B_2$ is supplied through the delay line 31 and an amplifier $26B_2$ to the second cathode K2 of the cathode ray tube 1B.

The other components of the embodiment shown in FIG. 15 are constructed same as those of the embodiment shown in FIG. 13.

The second embodiment shown in FIG. 15 operates similarly to the embodiment shown in FIG. 13 and performs the same effect.

While in the above embodiments of the invention, only the interval between the first and second electron beams Bm1 and Bm2 of the cathode ray tube 1B is increased, it is also possible that the interval between the first and second electron beams Bm1 and Bm2 of the cathode ray tube 1R or 1G can simultaneously be widened (wider than the interval corresponding to the afterglow time of the phosphor). In short, the interval between the first and second electron beams Bm1 and Bm2 emanated from a cathode ray tube having a phosphor which is subject to rapid brightness saturation is made wider than the interval corresponding to the afterglow time of the phosphor.

While in the above embodiments such a cathode ray tube is shown in which the first and second electron beams Bm1 and Bm2 are fundamentally spaced apart from each other with $\frac{1}{2}$ line interval and the non-interlaced visual display is carried out, the present invention is not limited to the above but can similarly be applied to the apparatus in which the first and second electron beams Bm1 and Bm2 are impinged on the same position fundamentally.

As will be clear from the above embodiments, according to the present invention, since the interval between the first and second electron beams in the cathode ray tube subject to rapid brightness saturation is made wider than the interval corresponding to the afterglow time of the phosphor to aroid the brightness saturation thereof, the cathode ray tube can be used to hold white balance up to larger cathode current and hence a picture image having high brightness can be provided.

In addition, since the brightness saturation is not avoided by defocusing the beam, there is no defect of causing the picture quality to be deteriorated.

The above description is given on the preferred embodiments of the invention, but it will be apparent that many modifications and variations could be effected by one skilled in the art without departing from the spirits or scope of the novel concepts of the invention, so that the scope of the invention should be determined the appended claims only.

We claim as our invention:

1. A multi-beam projector comprising:
    a first cathode ray tube having first and second cathodes, control grids and a fluorescent screen;
    means for applying a first component of a first video signal to said first cathode such that said first cathode emanates a first electron beam in response to said first component of said first video signal;
    means for applying a first component of a second video signal to said second cathode such that said second cathode emanates a second electron beam in response to said first component of said second video signal; said first and second electron beams being spaced apart by a first predetermined interval;
    a second cathode ray tube having first and second cathodes, control grids and a fluorescent screen;
    means for applying a second component of said first video signal to said first cathode of said second cathode ray tube such that said first cathode of said second cathode ray tube emanates a first electron beam in response to said second component of said first video signal;
    means for applying a second component of said second video signal to said second cathode of said second cathode ray tube such that said second cathode of said second cathode ray tube emanates a second electron beam in response to said second component of said second video signal; said first and second electron beams of said second cathode ray tube being spaced apart by a second predetermined interval, the second interval between said first and second electron beams of said second cathode ray tube being wider than the first interval between said first and second electron beams of said first cathode ray tuve;
    means for delaying said second component of said first video signal to provide said second component of said second video signal which is applied to said second cathode of said second cathode ray tube; and
    deflection means for horizontally and vertically deflecting said first and second electron beams of said first and second cathode ray tubes in synchronism with each other.

2. A multi-beam projector according to claim 1, wherein said first and second cathode ray tubes have respective deflection compensating means.

3. A multi-beam projector according to claim 2, wherein said deflection compensating means of said second cathode ray tube maintains an interval between said first and second electron beams of said second cathode ray tube which is wider than the interval between said first and second electron beams of said first cathode ray tube.

4. A multi-beam projector according to claim 1, wherein said interval between said first and second electron beams of said second cathode ray tube is wider than a minimum interval determined on the basis the scanning velocity of said first and second electron beams of said second cathode ray tube and the afterglow time of said fluorescent screen of said second cathode ray tube.

5. A multi-beam projector comprising:
    red and green cathode ray tubes for forming respective red and green picture images, each of said cathode ray tubes having first and second cathodes, control grids and a fluorescent screen emanating respective red and green picture images in response to respective red and green primary color signals;
    a blue cathode ray tube for forming a blue picture image, said blue cathode ray tube having first and second cathodes, control grids and a fluorescent screen emanating a blue picture image in response to a blue primary color signal;
    means for applying a first set of red, green and blue primary color signals to the first cathodes of said red, green and blue cathode ray tubes, respectively, such that said first cathodes emanate a first set of electron beams in response to said first set of primary color signals;
    means for applying a second set of red, green and blue primary color signals to the second cathodes of said red, green and blue cathode ray tubes, respectively, such that said second cathodes emanate a second set of electron beams in response to said second set of primary color signals, the beams of said second set of electron beams being spaced from the corresponding beams of said first set of electron beams by predetermined intervals, with the interval between said first and second electron beams of said blue cathode ray tube being wider than the interval between said first and second electron beams of the other cathode ray tubes;
    delay means for delaying said blue signal of said second set of primary color signals applied to said second cathode of said blue cathode ray tube; and
    deflection means for horizontally and vertically deflecting said first and second electron beams of said red, green and blue cathode ray tubes in synchronism with each other.

6. A multi-beam projector according to claim 5, wherein said red, green and blue cathode ray tubes have respective deflection compensating means.

7. A multi-beam projector according to claim 6, wherein said deflection compensating means of said blue cathode ray tube maintains an interval between said first and second electron beams thereof which is wider than the interval between said first and second electron beams of said red and green cathode ray tubes.

8. A multi-beam projector according to claim 5, wherein said interval between said first and second electron beams of said blue cathode ray tube is wider than a minimum interval determined on the basis of the scanning velocity of said first and second electron beams of said blue cathode ray tube and the afterglow time of said fluorescent screen of said blue cathode ray tube.

9. A multi-beam projector according to claim 5, wherein said delay means delays said blue signal two horizontal scanning periods.

10. A multi-beam projector according to claim 5, including processing means for forming said second set of primary color signals, said processing means including means for averaging a luminance component of a video signal used to produce said first set of primary color signals over two successive horizontal scanning periods.

* * * * *